3,378,529
N,N′-SULPHONYL NITROGENOUS MONOMERS
AND COPOLYMERS THEREOF
Ernst-Ulrich Kocher, Kuno Wagner, and Wolfgang von
der Emden, Leverkusen, Germany, assignors to Farbenfabriken Bayer Aktiengesellschaft, Leverkusen, Germany, a corporation of Germany
No Drawing. Continuation-in-part of application Ser. No.
396,705, Sept. 15, 1964. This application Feb. 3, 1965,
Ser. No. 430,181
Claims priority, application Germany, Apr. 20, 1964,
F 42,667; May 5, 1964, F 42,794; May 8, 1964,
F 42,824
25 Claims. (Cl. 260—67.5)

ABSTRACT OF THE DISCLOSURE

Monomers of the formula

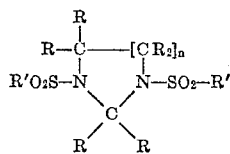

wherin R is hydrogen, lower alkyl or lower haloalky, R′ is alkyl, aryl, aralkyl or alkaryl containing up to 20 carbon atoms and $n$ is an integer from 1 to 3 and thermostable copolymers thereof with formaldehyde and its oligomers, especially trioxane.

---

The present invention relates to a novel class of nitrogenous monomers and to the polymers prepared by the copolymerization of these monomers with formaldehyde or its oligomers. This application is a continuation-in-part of application S.N. 396,705 filed Sept. 15, 1964 and now abandoned.

Many methods are known for transforming formaldehyde into linear polymers of different chain lengths. When heated, however, these polyoxymethylenes are easily and quantitatively split into monomeric formaldehyde.

Trioxane, the cyclic trimer of formaldehyde, can also be polymerized in the presence of cationically-active catalysts, more especially Lewis acids, to form linear polyoxymethylenes, but these are also thermally unstable. A considerable improvement in the thermostability of polyoxymethylenes can be produced by modification of their terminal groups, as was shown about 1930 by H. Staudinger, by introducing terminal acetyl groups or methoxy groups. The introduction of terminal alkyl groups supplies products which, on account of their purely polyacetal structure, also have an excellent resistance to alkali in addition to improved thermostability.

Polyoxymethylenes modified in this way still have too low a thermostability for technical requierments, since acids and oxygen split the polyoxymethylene chains in their interior, and this in turn results in a total breakdown of the molecules concerned. Two methods have already been proposed for overcoming this disadvantage. In one method, the influence of oxygen and acids can be counteracted by introducing additional stabilizers which have the effect of preventing the breaking down or decomposition. In the other method, copolymers are produced from trioxane and cyclic ethers, acetals and lactones. These copolymers contain not only (—$CH_2O$—) elements, but also, to a smaller extent, (—$CH_2$—$CH_2$—O—) elements. Any breaking down of the chain, once started, comes to a stop at such an oxyethylene group. Such products are similar in their chemical behaviour to those which are obtained by subsequent terminal group alkylation of polyoxymethylenes, i.e., their high susceptibility to the action of acid and influences of oxidation remains unchanged.

The use of additional stabilizers is accordingly also necessary with such copolymers.

A further advance in improving the thermostability of polyoxymethylenes could be produced by the use of sulphur-containing cyclic comonomers, but the polymerization velocity of the monomer mixture is then reduced, so that there are practical limits to the quantity of these comonomers.

A principal object of the present invention is to improve the thermostability of copolymers of formaldehyde. Another object is the provision of novel heterocyclic nitrogen compounds suitable for the production of polyoxymethylenes of improved properties. A more specific object is the provision of novel comonomers which can be designated as 1,3-diazacycloalkanes. A further object is a process for the production of these comonomers. Another important object of this invention is to provide novel trioxane copolymers having improved thermostability by a process wherein trioxane is copolymerized with the novel heterocyclic nitrogen compounds of this invention.

A process for the produtcion of trioxane copolymers with improved thermostability has now been found, in which trioxane is polymerized together with heterocyclic nitrogen compounds of the general formula

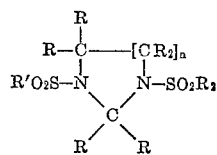

in the presence of cationically active catalysts at temperatures between $+50$ and $+120°$ C.

Inasmuch as the present invention resides both in the aforesaid heterocyclic nitrogen compounds and in the preparation of novel copolymers thereof, the invention will first be described with respect to the novel compounds and their preparation, which will be followed by a disclosure of the other phase of this invention.

THE MONOMERS

In the general formula for the novel heterocyclic nitrogen compounds of this invention, set forth above, R represents hydrogen, a lower alkyl radical or a lower halogenoalkyl radical, R′ represents an alkyl radical, aryl radical, aralkyl radical or alkaryl radical it being possible for the carbon atoms to number up to 20 and for $n$ to be an integer from 1 to 3.

Preferred alkyl radicals are lower alkyl radicals having 1–6 carbon atoms. Aryl radicals are preferably phenyl and naphthyl radicals which may be substituted by lower ($C_1$–$C_6$) alkyl radicals; the preferred aralkyl radical is the benzyl radical, which may be substituted in the nucleus by alkyl ($C_1$–$C_6$) radicals.

The ring system thus contains only carbon and nitrogen atoms, and apart from at least one C—C bond, there must merely be present C—N bonds, and the nitrogen atoms are connected by way of a sulphonyl sulphur atom to the radical R′.

The compounds can, therefore, be considered as 1,3-diazacycloalkanes and also as bis-sulphonamides. The class of compounds thus defined includes, for example, 1,3-bis-methanesulphonyl imidazolidine, 1,3-bis-methanesulphonyl hexahydropyrimidine, 1,3-bis-(2-chloroethanesulphonyl)-imidazoline, 1,3-bis-benzenesulphonyl imidazolidine, 1,3-bis-benzenesulphonyl hexahydropyrimidine, 1,3-bis-dodecyl-sulphonyl imidazolidine, 1,3-bis-toluenesulphonyl imidazolidine and N,N′-bis-benzene sulphonyl- 1,3-diazepine. These compounds are examples of the comonomers that can be used according to the invention.

The heterocyclic nitrogen compounds of the present invention can, for example, be obtained by reacting alkylene-bis-sulphonylamino compounds of the formula

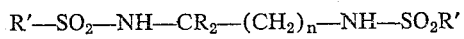

wherein R and R' have the meanings already mentioned, with aldehydes or ketones in the presence of an acid as catalyst at temperatures from 0° to 130° C., optionally in an inert solvent.

The aldehydes or ketones can be aliphatic, aromatic or heterocyclic aldehydes and aliphatic or aromatic-aliphatic ketones.

Examples of aldehydes which can be used according to the invention include aliphatic or aromatic aldehydes such as: Formaldehyde, acetaldehyde, trichloroacetaldehyde, trifluoroacetaldehyde, propionaldehyde, butyraldehyde, crotonaldehyde, isobutyraldehyde, benzaldehyde, o-chlorobenzaldehyde, salicylaldehyde, anisaldehyde, naphthalene-2-aldehyde, p-nitrobenzaldehyde, p-aminobenzaldehyde and sulphobenzaldehyde.

The following are examples of ketones: acetone, methyl ethyl ketone, cyclohexanone, acetophenone, 4-chloroacetophenone and propiophenone.

Of these two classes of compound, it is preferred to use the aldehydes, more especially formaldehyde.

The acids used according to the process include particularly such organic acids as chloroacetic acid, dichloroacetic acid, trichloroacetic acid or formic acid and such mineral acids as hydrochloric acid, suphuric acid, phosphoric acid and phosphorous acid.

Examples of the alkylene-bis-sulphonylamino compounds used according to the invention are: N,N'-bis-benzenesulphonyl ethylene diamine, N,N'-bis-methanesulphonyl ethylene diamine, N',N'-bis-methanesulphonyl propylene-1,2-diamine, N',N'-bis-methane sulphonyl propylene-1,3-diamine, N,N'-bis-benzanesulphonyl butylene-1,4-diamine, N,N'-bis-methanesulphonyl 1,2-diaminobut-3-ene, N,N'-bis-vinyl sulphonyl ethylene diamine, N,N'-bis-allyl sulphonyl ethylene diamine, N,N'-bis-benzenesulphonyl trimethylene diamine, N,N'-bis-(p-toluenesulphonyl) ethylene diamine, and N,N'-bis-chloroethane sulphonyl ethylene diamine.

The process according to the invention can generally be carried out on approximately equivalent quantities of the reactants. The carbonyl component can alternatively be present in excess, up to about 5 times the stoichometric amount. The reaction can be conducted either without solvents or in a solvent, for example water or organic solvents which are inert with respect to aldehydes and ketones in acid medium, such as ethers, as diethylether, tetrahydrofuran, aromatic or aliphatic and optionally chlorinated hydrocarbons, e.g., benzene and chlorobenzenes, also in admixture with water. It is also possible to use as solvent an excess of the acid necessary as catalyst, more especially formic acid and dichloroacetic acid. When using a solvent, at least 0.1% by weight of acid, based on the carbonyl compound, is used as catalyst.

The process can be carried out at temperatures from 0 to 130° C., advantageously 20 to 110° C. Temperatures in the region of 80° C. are usually employed. The reaction according to the invention is usually complete within a few minutes, but reaction times of several hours may be necessary. Thus, the range of the reaction time is from about 5 minutes to about 5 hours, preferably 10 minutes to 1 hour. Usually the reaction time will be about half an hour. In individual cases, the yield can be improved by distilling off the water of reaction, e.g., as an azeotrope with benzene.

The alkylene —N,N'-bis-sulphonamides used as starting material can be prepared in a manner known per se by reacting diamines with sulphonic acid chlorides in the presence of alkali or tertiary amines.

The heterocyclic nitrogen compounds of this invention are useful not only as monomers for the production of polyoxamethylenes of improved properties but are also useful as stabilizers for plastics such as polyamides. Moreover those compounds containing higher hydrocarbon radicals, e.g., the radicals R' of their general formula should be $C_8$ to $C_{18}$ alkyl radicals, can be used as surface-active agents.

The preparation of the heterocyclic nitrogen monomers of this invention is illustrated in the following examples:

Example 1

N,N'-dibenzenesulphonyl imidazolidine.—55 parts by volume of formic acid and 20 parts by weight of 40% formalin solution are added to 68 parts by weight of N,N'-bis-benzenesulphonyl ethylene diamine. The mixture is heated for 30 minutes at 80° C., and after a few minutes, a clear solution is formed, and crystallization occurs, even from the hot solution. After cooling, the crystals are separated by suction-filtration and washed with cold formic acid followed by methanol.

Melting point 146° to 150° C. (after recrystallization for methanol). $C_{15}H_{16}N_2O_4S_3$ calculated: 51.15%, C; 4.58%, H; 7.98%, N. Found: 51.15%, C; 4.68%, H; 8.21%, N.

Example 2

N,N-dimethanesulphonyl imidazolidine.—43.2 parts by weight of N,N'-bis-methanesulphonyl ethylene diamine are dissolved in 50 parts by volume of formic acid, 20 parts by weight of 40% formalin solution are added and the mixture is stirred for 30 minutes at 80° C. On cooling, the cyclization product precipitates in crystalline form, the quantity of crystals being increased by adding 50 parts of water. After filtering with suction and washing with water, the solid is recrystallized from a little methanol. M.P. 140–141° C.

Yield: 33 parts by weight=72.5% of the theoretical. $C_5H_{12}N_2O_4S$ calculated: 26.30%, C; 5.23%, H; 12.18%, N; mol. wt. 228.28. Found: 26.31%, C; 5.27%, H; 12.31%, N.

Example 3

N,N'-di(p-toluenesulphonyl)-imidazolidine.—312 parts by weight of N,N'-di-(p-toluenesulphonyl)-ethylene diamine are heated with 350 parts by volume of formic acid and 120 parts by weight of 40% formalin solution for 30 minutes at 80° C. After cooling, the substance is suction-filtered and washed with water and then recrystallized from methanol. M.P. 159–160° C.

Yield: 249 parts by weight = 78% of the theoretical. $C_{16}H_{18}N_2O_4S_2$ calculated: 52.45%, C; 4.95%, H; 7.65%, N; mol. wt. 366.43. Found: 52.58%, C; 5.1%, H; 7.6%, 5.39%, H; 7.49%, N; 17.05%, S.

Example 4

N,N'-dibenzenesulphonyl hexahydropyrimidine.— 70.8 parts by weight of N,N'-dibenzenesulphonyl trimethylene diamine are heated in 50 parts by volume of formic acid and 20 parts by weight of 40% formalin solution for 30 minutes at 80° C. A milky solution is formed, from which the ring-closure product separates out in crystalline form on cooling. M.P. 143–144° C. after recrystallisation from methanol.

$C_{16}H_{18}N_2O_4S_2$ calculated: 52.45%, C; 4.95%, H; 7.65%, N; mol. wt. 366.43. Found: 52.58%, C; 5.1%, H; 6%, N.

Example 5

N,N'-dibenzenesulphonyl-1,3 - diazacycloheptane.—44 parts by weight of tetramethylene-1,4-diamine are mixed with 100 parts by weight of 40% sodium hydroxide solution and 100 parts of water. 176 parts by weight of benzene sulphonylchloride are added dropwise within 30 minutes while stirring at 70° C., and stirring is continued for 10 minutes at 70° C. After adding another 100 parts of water, the N,N' - (dibenzenesulphonyl) - tetramethylene- 1,4-diamine that forms is filtered off with suction and washed with water.

The crude product is treated, while moist, with 200 parts by volume of formic acid and 100 parts by weight of 40% formalin solution and heated to 80° C. The material immediately dissolves. After 30 minutes, the solution is cooled, diluted with 200 parts of water, filtered with suction and washed with water. The yield is almost quantitative. Melting point, after recrystallization from isopropanol, 148° to 149° C.

$C_{17}H_{20}N_2O_4S_2$ calculated: 53.7%, C; 5.41%, H; 7.37%, N; mol. wt. 380.47. Found: 53.6%, C; 5.47%, H; 7.25%, N.

COPOLYMERS

The heterocyclic nitrogen compounds of this invention whose preparation is described above may be copolymerized with formaldehyde or its oligomers, especially trioxane, to form new thermostable copolymers of formaldehyde.

The quantity of these novel heterocyclic nitrogen compounds employed in the preparation of such copolymers is advantageously from 0.5 to 20 mol percent and particularly advantageously from 0.5 to 5 mol percent, based on the trioxane introduced, if the polymer is to have the properties of the polyoxymethylene. Larger quantities of the comonomer, up to 50 mol percent, likewise be used, if it is desired that the polymer have modified properties, for example, lowered melting point, lesser degree of crystallization and improved solubility in organic solvents.

It is a surprising fact that the new comonomers do not influence the polymerization velocity of the trioxane and accordingly also do not require any increased quantities of catalyst, so that even with comonomer quantities of 10% by weight and more, based on trioxane, molecular weights higher than 30,000 can readily be obtained.

The organonitrogen monomers used according to the invention surprisingly do not polymerize by themselves, under the conditions of the copolymerization.

The following are examples of cationically active catalysts for the process according to the invention: Strong mineral acids, such as sulphuric acid and perchloric acid, aliphatic and aromatic sulphonic acids, such as methane sulphonic acid, butane sulphonic acid, benzene sulphonic acid and p-toluene sulphonic acid, Lewis acids such as boron trifluoride, boron trichloride, aluminum trichloride, ferric chloride, antimony pentachloride, titanium tetrachloride and tin tetrachloride or the corresponding fluorides, addition compounds of boron halides with ethers, carboxylates, carboxylic anhydrides, amines, nitriles and monocarboxylic or dicarboxylic amides, e.g., the adducts of boron trifluoride and diethyl ether, di-n-butyl ether, anisole, ethyl acetate, acetic anhydride, diphenylamine, acetonitrile, dimethyl formamide, glacial acetic acid or water. Halogenous organometallic compounds of aluminum, such as monoalkyl aluminum dichlorides, can also be used as cataionically active compounds.

Oxonium salts and carboxonium salts, such as triethyl oxonium fluoborate and 2-methyl dioxolenium fluoborate and fluoborates of aryl-diazaonium compounds, which change at high temperature and with evolution of nitrogen into aryl cations, such as p-nitrophenyl diazonium fluoborate, likewise are cationically active catalysts suitable for the process.

The catalysts are added to the polymerization medium in quantities from 0.001 to 1% by weight, based on the weight of the formaldehyde introduced.

The polymerization may, with advantage, be carried out in a closed apparatus which permits working at an elevated pressure up to 5 atm. gauge. When operating under high pressure the temperature used in the operation can be raised to 150° C.

The copolymerization can be carried out as block polymerization, which takes place within a short time and with an almost quantitative yield. In such a process, the catalyst is melted together with the trioxane and simultaneously the comonomer is added, or initially the trioxane is melted together with the comonomer and then the catalyst is added, optionally in an inert solvent. The polymerization can, however, also be carried out in suspension in an organic liquid in which trioxane has only limited solubility. Suitable for such an embodiment of the process are, for example, straight-chained aliphatic hydrocarbons with more than 8 and up to about 20 carbon atoms or mixtures thereof, for example a $C_{12}$–$C_{18}$ fraction with a boiling range from 230° to 320° C.

If the polymerization is carried out in solution, it is for example possible to employ the following organic solvents: Benzene, toluene, hexane, heptane, cyclohexane, isooctane, white spirit and chlorinated hydrocarbons, as well as hydrogenated oligomers ($n=2$ to 5) of isobutylene and mixtures thereof.

When the copolymers are heated, they suffer a certain decomposition before they reach their maximum stability. This decomposition reaction can be accelerated by heating the crude polymer in inert solvents, but also in alcohols which form semi-acetals with the decomposed formaldehyde.

In order to promote this reaction, organic or inorganic bases, which simultaneously destroy the polymerization catalyst, are expediently introduced.

Depending upon the intended use, copolymers of different molecular weight range can be produced. Copolymers of high molecular weight whose reduced viscosity is in the range from 0.6 to 3.0 (measured at 60° C. in an 0.5% solution of p-chlorophenol) are suitable for use as thermoplastic materials for the production of moulded elements by injection moulding or for the production of fibres by the melt-spinning or dry-spinning process. In the preparation of such copolymers, the quantity of the introduced organonitrogen compound is advantageously 0.5 to 5 mol percent based on introduced trioxane, calculated as $CH_2O$. Light stabilizers, dyestuffs, pigments and optionally heat and oxidation stabilizers, fillers or plasticizers can, for example, be added to these polymers.

If the copolymers are to be used as intermediates or auxiliary materials in the plastics field, it may also be desirable that they have lower molecular weights, down to 500. In such instances, higher proportions of the nitrogen-containing comonomer are used, up to 50 mol percent based on monomeric formaldehyde. The copolymers obtained can then be resinous in consistency at room temperature. With increasing proportions of formaldehyde, the crystallinity of the copolymers increases and the melting point is raised.

Furthermore, it is possible to modify still further the properties of the copolymers by additional use of other comonomers, for example cationically polymerizable olefines or cyclic organooxygen and/or organosulphur compounds. Examples of such other comonomers are styrene, acrylonitrile, ethyl vinyl ether, methyl vinyl sulphone or epoxy compounds, such as ethylene oxide or propylene oxide, cyclic acetals such as 1, 3-dioxolane or diethylene glycol formal, as well as their thio analogues, such as ethylene sulphide, propylene sulphide, 1,3-oxthiolane or thiodiglycol formal.

The copolymers produced according to the invention achieve their excellent thermostability after only a short thermal or chemical treatment, during which unstable fractions are decomposed. This can be effected by heating the substance alone or in suspension, e. g., in high-boiling hydrocarbons, or also in solution, for example, in dimethyl formamide, butyrolactone or dimethyl sulphoxide, at temperatures from 120° to 250° C., advantageously 170 to 230° C. More unstable fractions can, however, also be decomposed by the action of aqueous sodium hydroxide solution or alcohols with up to 10 carbon atoms, e.g. cyclohexanol, in the presence of basic compounds, for instance, alkali metal hydroxides and organic bases, such as pyridine, tri-n-butylamine or alkanolamines. The decomposition up to terminal comonomer units can also take place during the granulation process in an extrusion machine, optionally with addition of organic bases.

Light stabilizers, dyestuffs, pigments and, optionally, heat and oxidation stabilizers, fillers or plasticizers, can also be added. The operation can also take place under reduced pressure or in an inert gas atmosphere.

Nitrogenous copolymers of trioxane or formaldehyde have so far not become known. Rather, the —O—CH$_2$—N grouping contained in these compounds was considered extremely unstable. It is therefore, surprising that it is just this bond which has a thermostabilizing influence in the polymer if the nitrogen is substituted with a sulphone group.

The preparation of some of the typical copolymers of this invention is illustrated in the following examples.

Example 6

0.17 g. of boron fluoride dibutyl etherate were added at 70° C., while stirring, to 300 g. of trioxane, 15.2 g. of 1,3-bis-methanesulphonyl imidazolidine (prepared by reacting 1 mol of N,N'-dimethanesulphonyl ethylene diamine with 1 mol of 40% formaldehyde in formic acid) and 300 ml. of a saturated hydrocarbon fraction (B.P. 230°–320° C.). The copolymer in powder form began to precipitate after a few seconds from the mixture with a rise in temperature to 85° C. After 5 hours at an external temperature of 70° C., the polymer was filtered off with suction, washed with methylene chloride and then with acetone. The yield in air-dry form was 310 g.

The thermostability of the material was measured after treatment for 10 hours with 5% sodium hydroxide solution at 95° C. The decrease in weight was 1.8% per hour at 222° C. The intrinsic viscosity, measured in 0.5% solution in p-chlorophenol at 60° C. was η=0.987.

Example 7

The procedure of Example 6 is followed but, instead of using 1,3-bis-methanesulphonyl imidazolidine as comonomer, 23.5 g. of 1,3-dibenzenesulphonyl imidazolidine (prepared in analogous manner) were introduced. Only 0.10 g. of boron fluoride dibutyl etherate was used as catalyst. The yield was 290 g. The thermostability test, after alkaline treatment, shows a decrease in weight of 0.1% per hour at 222° C. The sulphur content of the copolymer was 1.14% by weight and the nitrogen content 0.54% by weight. The intrinsic viscosity, measured in 0.5% solution, in p-chlorophenol at 60° C. showed a value of η=0.845.

Example 8

Example 7 was repeated with 47 g. of 1,3-bis-benzenesulphonyl imidazolidine and 0.06 g. of boron fluoride dibutyl etherate. The polymerization was stopped after 2 hours. Yield: 309 g. of air-dry copolymer. The thermostability test, after alkaline treatment, showed a decrease in weight of 2.0% per hour at 222° C. The sulphur content of the copolymer was 2.05% by weight and the nitrogen content was 0.99% by weight. The intrinsic viscosity, measured in 0.5% solution, in p-chlorophenol at 60° C., had a value of η=1.127.

It is understood that some modifications and variations may be effected without departing from the spirit and scope of the novel concepts of the present invention.

We claim:

1. Heterocyclic nitrogen compounds of the general formula

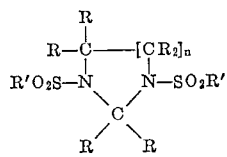

wherein R is selected from the group consisting of hydrogen, a lower alkyl radical and a lower haloalkyl radical and R' is selected from the group consisting of an alkyl radical having 1 to 6 carbon atoms, an aryl radical having 6 to 20 carbon atoms, an aralkyl radical having 6 to 20 carbon atoms and an alkaryl radical having 6 to 20 carbon atoms and n is an integer from 1 to 3.

2. N,N'-dibenzenesulphonyl imidazolidine.
3. N,N'-dimethanesulphonyl imidazolidine.
4. N,N'-di-(p-toluenesulphonyl) imidazolidine.
5. N,N'-dibenzenesulphonyl hexahydropyrimidine.
6. N,N'-dibenzenesulphonyl-1,3-diazacycloheptane.
7. A process for the production of new heterocyclic nitrogen compounds of the general formula

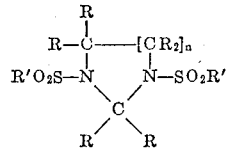

wherein R is selected from the group consisting of hydrogen, a lower alkyl radical and a lower haloalkyl radical and R' is selected from the group consisting of an alkyl radical having 1 to 6 carbon atoms, an aryl radical having 6 to 20 carbon atoms, an aralkyl radical having 6 to 20 carbon atoms and an alkaryl radical having 6 to 20 carbon atoms and n is an integer from 1 to 3, and which comprises reacting alkylene bis-sulphonylamino compounds of the formula

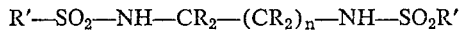

R'—SO$_2$—NH—CR$_2$—(CR$_2$)$_n$—NH—SO$_2$R' wherein R, R', and n have the meanings indicated above, with a carbonyl compound selected from the group consisting of aldehydes and ketones, in the presence of an acid catalyst with a dissociation constant 10$^{-4}$, at temperatures from 0° to +130° C.

8. The process of claim 7 wherein said acid catalyst is formic acid.

9. The process of claim 7 wherein said acid catalyst is dichloroacetic acid.

10. The process of claim 7 wherein said carbonyl compound is formaldehyde.

11. The process of claim 7 wherein formic acid is used simultaneously as solvent and catalyst.

12. The process of claim 7 wherein the reaction is conducted in an inert solvent.

13. The process of claim 12 wherein said solvent is selected from the group consisting of water, ether, tetrahydrofurane, an aromatic hydrocarbon, an aliphatic hydrocarbon, and a chlorinated hydrocarbon.

14. A process for the production of trioxane copolymers which comprises polymerizing trioxane at a temperature from +50 to +150° C., in the presence of cationically-acting catalysts, with 0.5 to 50 mol percent of a heterocyclic nitrogen compound of the formula

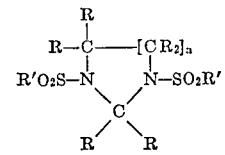

wherein R is selected from the group consisting of hydrogen, a lower alkyl radical and a lower haloalkyl radical and R' is selected from the group consisting of an alkyl radical having 1 to 6 carbon atoms, an aryl radical having 6 to 20 carbon atoms, an aralkyl radical having 6 to 20 carbon atoms and an alkaryl radical having 6 to 20 carbon atoms and n is an integer from 1 to 3.

15. The process of claim 14 wherein other heterocyclic compounds selected from the group consisting of ethylene oxide, propylene oxide, 1,3-dioxolane, diethylene glycol formal and the corresponding thio-compounds are concurrently used as additional comonomers.

16. The process of claim 14 wherein the copolymerization is carried out at an elevated pressure of about 1 to 5 atmospheres.

17. The process of claim 14 wherein the copolymerization is carried out in suspension in an organic solvent.

18. The process of claim 14 wherein the copolymerization is carried out in suspension in an organic solvent medium comprising a straight-chain aliphatic hydrocarbon having 8 to 20 carbon atoms.

19. The process of claim 14 wherein the copolymerization is carried out as block polymerization in the melt.

20. The process of claim 14 wherein the copolymerization is carried out as solution polymerization in an organic solvent.

21. The process of claim 14 wherein the copolymerization is carried out as solution polymerization in an organic solvent selected from the group consisting of benzene, toluene, hexane, heptane, cyclohexane, isooctane, white spirit and chlorinated hydrocarbons, as well as hydrogenated oligomers ($n=2$ to 5) of isobutylene and mixtures thereof.

22. The process of claim 14 wherein the cyclic nitrogen compound is selected from the group consisting of 1,3-bis-methanesulphonyl imidazolidine, 1,3-bis-methanesulphonyl hexahydropyrimidine, 1,3-bis-(2-chloroethanesulphonyl) - imidazoline, 1,3 - bis-benzene-sulphonyl imidazolidine, 1,3-bis-benzenesulphonyl hexahydropyrimidine, 1,3-bis-dodecylsulphonyl imidazolidine and 1,3-bis-toluenesulphonyl imidazolidine.

23. The process of claim 14 wherein the cationically-acting catalyst is selected from the group consisting of a strong mineral acid, a sulphonic acid, a Lewis acid, a boron halide etherate and a halogenous organoaluminium compound.

24. The product produced by the process of claim 14.

25. The product of claim 24 wherein said heterocyclic nitrogen compound is selected from the group consisting of 1,3-bis-methanesulphonyl imidazolidine, 1,3-bis-methanesulphonyl hexahydropyrimidine, 1,3 - bis - (2 - chloroethanesulphonyl)-imidazolidine, 1,3-bis-benzenesulphonyl hexahydropyrimidine, 1,3-bis-dodecylsulphonyl imidazolidine and 1,3-bis-toluenesulphonyl imidazolidine.

References Cited
UNITED STATES PATENTS 3,184,447   5/1965   Paquette _____ 260—239

WILLIAM H. SHORT, *Primary Examiner.*

E. M. WOODBERRY, *Assistant Examiner.*